United States Patent
Ernst et al.

(10) Patent No.: US 7,408,679 B2
(45) Date of Patent: Aug. 5, 2008

(54) METHOD, SYSTEM AND PROGRAM PRODUCT FOR MULTIPLE PEL PRINT QUALITY ENHANCEMENT

(75) Inventors: Larry M. Ernst, Longmont, CO (US); John Charles Wilson, Longmont, CO (US)

(73) Assignee: InfoPrint Solutions Company, LLC., Boulder, CO (US)

( * ) Notice: Subject to any disclaimer, the term of this patent is extended or adjusted under 35 U.S.C. 154(b) by 814 days.

(21) Appl. No.: 10/693,783

(22) Filed: Oct. 24, 2003

(65) Prior Publication Data

US 2005/0088671 A1 Apr. 28, 2005

(51) Int. Cl.
*H04N 1/40* (2006.01)

(52) U.S. Cl. .................... 358/3.02; 358/1.7; 358/410

(58) Field of Classification Search ........... 358/1.7, 358/1.9, 2.1, 3.02, 3.2–3.22, 410, 3.11–3.12
See application file for complete search history.

(56) References Cited

U.S. PATENT DOCUMENTS 5,479,175 A * 12/1995 Cianciosi et al. ........... 347/252
5,515,480 A * 5/1996 Frazier ..................... 358/1.9
7,218,336 B2 * 5/2007 Amm et al. ............... 347/239

* cited by examiner

*Primary Examiner*—Thomas D. Lee
*Assistant Examiner*—Stephen Brinich
(74) *Attorney, Agent, or Firm*—Duft Bornsen & Fishman, LLP (57) ABSTRACT

Disclosed is a method, system and program product for performing multiple-pel print quality enhancement (PQE). As in known methods of PQE, a determination is made of an adjusted sub-pulse value of each pel of an image. In accordance with embodiments of the present invention, at least two adjacent pels are then grouped together and a determination is made of a combined pulse width value to charge the combined area of the at least two adjacent pels. Also determined is position information indicating the alignment of the pulse width within the combined area. The combined pulse width and position information is sent as input to a pulse width modulator operating at a speed equal to the video data rate of the printer divided by the number of pels for which the pulse width data is combined.

46 Claims, 5 Drawing Sheets

METHOD, SYSTEM AND PROGRAM PRODUCT FOR MULTIPLE PEL PRINT QUALITY ENHANCEMENT

CROSS-REFERENCE TO RELATED APPLICATIONS

This application is relating to the following co-pending and commonly-assigned patent applications, all of which are incorporated herein by reference in their entirety:

"Method, System, and Program for Reducing Toner Usage in Print Output," having Ser. No. 09/535,859; and "Method, System, and Program for Producing a Look-up Table to Enhance Print Quality," having Ser. No. 09/535,857.

BACKGROUND OF THE INVENTION

To print an image, a print engine processor, referred to herein as a raster image processor, converts the image in a page description language or vector graphics format to a bit mapped image indicating a value to print at each pixel of the image. Each bit representing a pixel that is "on" is converted to an electronic pulse. The electronic pulses generated from the raster pel data at which to deposit toner turns the laser beam on to positively charge the surface of a rotating drum, which is a photo-conducting cartridge, that has a coating capable of holding an electrostatic charge. The laser beam turns on and off to beam charges at pixel areas on a scan line across the drum that will ultimately represent the output image. After the laser beam charges all pels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Note that the terms "pixel" and "pel" are used throughout this specification in an interchangeable manner. Each term refers to one dot or point of data which make up the complete image. Also, the above discussion describes the drum, the toner and other components as having certain charges allowing the toner to ultimately be drawn to the paper. Similar printing systems are well known to those skilled in the art which utilize components having the opposite charges, providing the same end result. This and other variations in the system of producing printed output may be made without departing from the scope of the present invention.

Many modern laser printers filter the bit map images using a look-up table to alter the pulses generated for each pixel to accomplish certain filtering results. For instance, filters can be used to provide an economy mode where toner is reduced, remove jagged edges, improve image quality, improve print quality using known techniques referred to as 'Print Quality Enhancement' (PQE) or reduce the density of images. The subject matter of this invention is primarily concerned with filtering for PQE purposes. Typically, the laser printer will gather an area of data and replace either one or all the pulse values for the pixels based on the gathered area of pixel data matching a value in the look-up table. Such look-up tables modify the pixel output by altering the pulse normally used for an "on" pixel value with a pulse width modulator to shorten the pulse width to reduce the electric charge the laser beam places on the drum. This technique of shortening the pulse width for a pixel is referred to as 'sub-pulse modulation.' By shortening the pulse width associated with a pixel of data to a 'sub-pulse', the resulting image will not cover the entire pixel area. For instance, if the pulse width is modulated to one-half a full width, the image in that pixel area will only cover one-half the area of the pixel.

The look up tables used for sub-pulse modulation may also contain alignment information for aligning the sub-pulse within the pel region for improved print quality. The techniques used to perform sub-pulse modulation and many varying rules for aligning the created sub-pulses to attain PQE are well known to those skilled in the relevant arts. Pels printed using less than the full width pulse for PQE purposes may be referred to as "gray-scale" pels as they are printed somewhere between white and black. Techniques other than look-up tables may also be utilized for PQE purposes as long as such techniques provide for pre-calculation of pulse width values to be associated with predicted patterns of pel data.

A system utilizing sub-pulse modulation for PQE purposes must feed a pulse width modulator with information indicating the width and alignment of the pulse to create for each pixel. This means that the pulse width modulator must be able to accept and process the input and create and deliver the required pulse width to the laser within the time it takes the printer to print one pel. As modern, high-function printers continue to operate at faster and faster speeds, this becomes more difficult. The latest printers are capable of operating at speeds of 100 MHz or greater, which leads to a "Pel Time", or the time needed by the printer to process one pixel, of 10 ns or less. Another way to measure the speed of a printer is called the "Video Data Rate", which is the number of pels written on the drum by the printhead per second. As printer speeds continue to increase, it is becoming more and more difficult for existing and future pulse width modulators to function properly. Increases in speed are more difficult to achieve in the pulse width modulators because some minimum time is required to reset the pulse width modulator after each pulse.

For the above reasons, there is a need in the art for an improved technique for processing pels of print output for PQE in order to allow current and future pulse width modulators to keep up with the increasing printer speeds without reducing print image quality.

SUMMARY OF THE INVENTION

To overcome the limitations in the prior art described above, preferred embodiments disclose a method, system, and program for performing multiple-pel PQE. When operating according to the present invention, the pels surrounding each subject pel are identified. For each subject pel, a pulse width value is generated based on a pattern of the surrounding pels of the subject pel. Two or more adjacent subject pels are then grouped together and a combined pulse width power is determined for a pulse covering the combined region of the grouped pels. Further, position information is calculated to align the combined pulse width within the combined region. The combined pulse width power and position information is then fed to a pulse width modulator. The unmodified pulse width modulator creates a pulse corresponding to the input combined pulse width power and position information as if it were for a single pel. In accordance with the present invention, when grouping two pels at a time, the pulse width modulator is operated at one-half the Video Data Rate of the printer. Because the pulse width modulator is operating at one-half the Video Data Rate of the printer, the output pulse effectively charges the drum for two pels of data. As such, a printer according to the present invention can implement PQE using pulse width modulation at up to twice the speed of available pulse width modulators.

In other embodiments of the present invention, three or more pels may be grouped together before sending the combined pulse width and position information to the pulse width modulator. In such embodiments, the pulse width modulator speed would be the printer Video Data Rate divided by the number of pels grouped together. For instance, when operating on three pels at a time, the pulse width modulator speed would be one-third the printer Video Data Rate.

Further in accordance with the present invention, the combined pulse width power and position information may be encoded in one or more look-up tables that provide one output combined pulse width power and position for an input pair of pulse width values. Alternatively, other known methods may be employed for pre-calculating and accessing the combined pulse width power and position information. Depending on the processing speed and bandwidth available, it may also be possible to calculate the combined pulse width power and position information 'on the fly' based on known PQE techniques and algorithms.

Preferred embodiments provide a technique for sub-pulse width modulation to allow higher printer speeds in relation to the speed of provided pulse width modulators. The present invention allows increased speeds by feeding the pulse width modulator combined pulse width power and position information for two or more pels at a time. When the pulse width modulator, operating at a speed equal to the printer Video Data Rate divided by the number of pels combined in the input data, produces the indicated pulse at the proper position, the pulse effectively covers the number of pels combined in the data in a single pulse.

BRIEF DESCRIPTION OF THE DRAWINGS

Some of the purposes of the invention having been stated, others will appear as the description proceeds, when taken in conjunction with the accompanying drawing, in which:

FIG. 4b illustrates the adjusted pulse width values for the two pels in the example of FIG. 4a.

DETAILED DESCRIPTION OF THE INVENTION

While the present invention will be described more fully hereinafter with reference to the accompanying drawings, in which the preferred embodiments of the present invention are shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
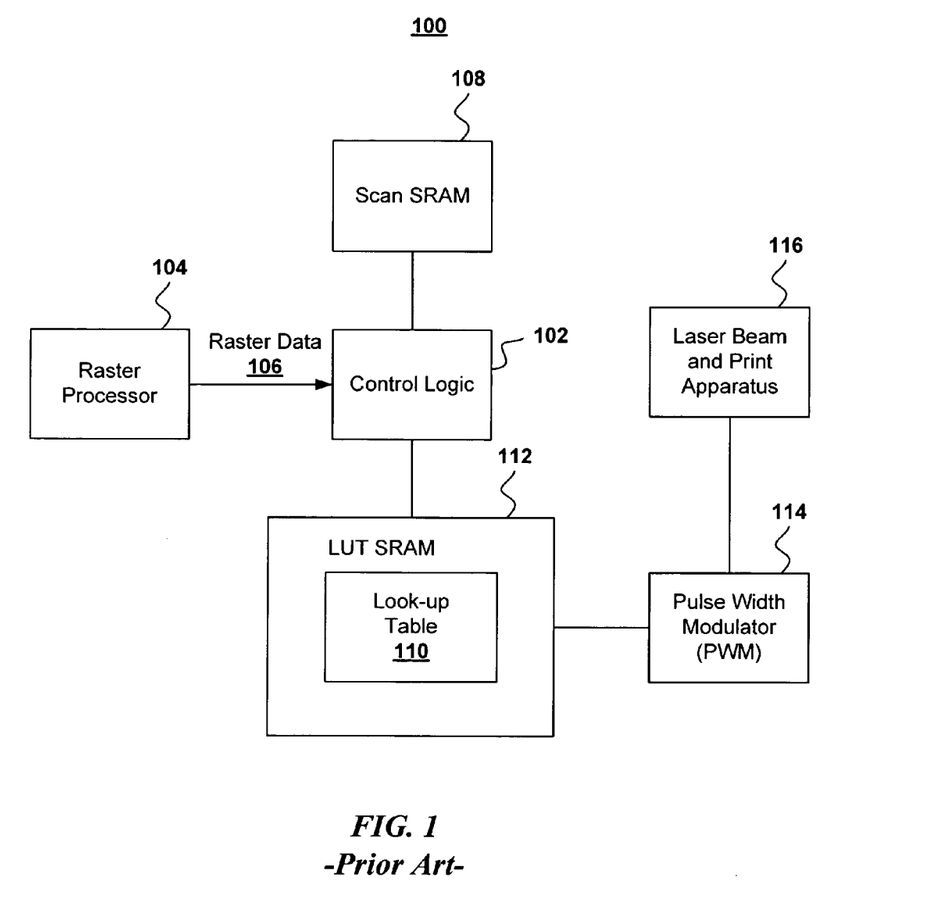
FIG. 1 illustrates a printing/computing environment in which known embodiments of print quality enhancement may be implemented.

FIG. 1 illustrates a computing/printing environment 100 in which embodiments of the present invention may be implemented. Control logic 102 comprises a central processing unit (CPU), a programmable chip, such as a field programmable gate array (FPGA), or other type of multi-purpose or specialized microprocessor, which includes logic to perform the described pel filtering operations. The raster processor 104 generates raster data from vector graphics or page description language commands. The raster data 106 comprises scan lines of pels, where each pel has an 'on' or 'off' value and location information for the pel in the scan line. The control logic 102 accesses scan lines of raster data 106 and may transfer the pels to a scan static random access memory (SRAM) 108. The control logic may alternatively transfer the scan lines of raster data 106 to any type of locally accessible memory for later processing, as such techniques are well known in the art.

The control logic 102 accesses the pel data from the SRAM 108 (or other storage, not shown) and uses at least one look-up table 110 which was previously calculated and stored in local storage 112 to determine an adjusted output value for each input pel value. The look-up table 110 may be used to accomplish any one of several types of pel filtering operations, such as print quality enhancement, toner reduction, etc. The present invention is most concerned with print quality enhancement. The look-up table 110 specifies how to modify a pel based on the values of the surrounding pels. A pel is modified by adjusting its pulse width. The pulse width data for a pel is transferred to the pulse width modulator 114 to generate an electronic pulse which controls the laser 116 to electrically charge the area of the drum corresponding to the pel as part of the printing process. Since an adjusted pulse width will, by definition, cover less than the entire pel area (unless it is adjusted to full width (all black), or zero width (all white)), alignment information must also be generated and fed to the pulse width modulator, describing where, within the pel area, the adjusted pulse width should be aligned. Such alignment data may also be obtained from the look-up table 110. Alternatively, both the adjusted output values and the alignment data for each pel may be obtained by using any other known pre-calculation and access method, or may be calculated 'on-the-fly', assuming adequate processing speed and bandwidth is available in the control logic 102.

A more detailed discussion of these known techniques for performing print quality enhancement and other pel adjustments is contained in the co-pending patent application entitled "Method, System, and Program for Reducing Toner Usage in Print Output," having (Ser. No. 09/535,859), which is incorporated herein by reference in its entirety. Another co-pending and related application entitled "Method, System, and Program for Producing a Look-up Table to Enhance Print Quality," having (Ser. No. 09/535,857) provides methodologies for creating the look-up tables 110a-d and is also incorporated herein by reference it its entirety.

Figure 2:
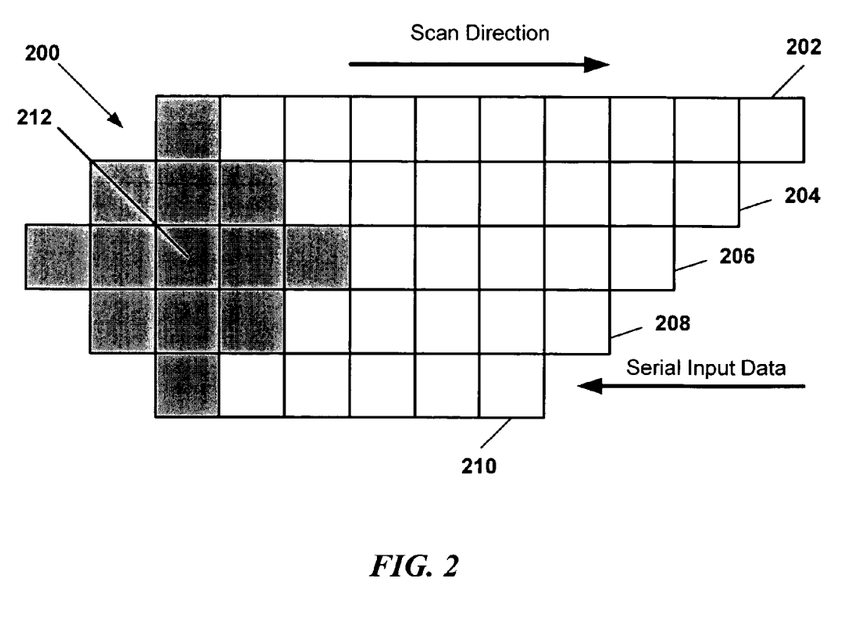
FIG. 2 illustrates a window of pel data accessed for filtering operations in accordance with known PQE techniques and with embodiments of the present invention.

FIG. 2 illustrates how scan line raster data is accessed and processed by the control logic 102. In FIG. 2, each block represents a pel, a white block represents buffered pel data and a darkened block represents one pel the control logic 102 is accessing in a window 200 of pels to be considered during the filtering operation. In the illustrated embodiment, the control logic 102 accesses a diamond-shaped group of pels 200 from five different scan lines 202, 204, 206, 208, 210 which surround a center pel 212. In a typical embodiment, one or more of the at least one look-up table 110 includes an output value for each unique combination of values for the pels in window 200. The output value provides an adjusted pulse width for the center pel 212 in the window 200. Depending on the number of pels included in window 200, there can be $2^{13}$ or more possible patterns of pels. Some embodiments reduce the number of output values necessary for the various patterns by combining the possible patterns into some number of pattern categories where the patterns within each category share some common characteristics which result in the same adjustment of a pel centered within such a pattern. As such, the at least one look-up table 210 need only provide an output value for each category of pattern instead of each individual pattern. The techniques illustrated in FIG. 2 and discussed above are known in the art of print quality enhancement and are discussed in further detail in incorporated patent application having (Ser. No. 09/535,859).

The purpose of the window 200 is to provide an adjusted pulse width for the center pel 212 based on the surrounding pels that have the most affect on the center pel 212. As illustrated in FIG. 2, the window 200 is shaped as a diamond to approximate the circular shape of a charge the laser creates on the drum and the shape in which toner is applied to a pel. Alternatively, the window 200 of surrounding pels considered in modifying the pulse width of a center pel 212 may be shaped as a square, a rectangle or any other shape considered advantageous for a given application.

In processing the pels in a given bitmap, the control logic 102 reads the pels in the window 200 by reading the scan lines 202, 204, 206, 208, 210 one at a time. The window 200 shifts to the right through the scan lines. After processing all pels in a scan line as the center pel 212, the window 200 shifts down to start including subsequent scan lines in the window 200. In this manner, every pel in the bitmap is, at one point, processed as the center pel 212 and is adjusted based on the values of the surrounding pels in the window 200. Preferably, only the original pel values are used for surrounding pels in adjusting the pel value for center pels 212. That is, after a center pel 212 is adjusted, when that previous center pel becomes a surrounding pel around another center pel 212 in the window 200, the original value of that center pel is used and not the adjusted pulse width value. The above print quality enhancement techniques are described in more detail in the co-pending patent applications mentioned and incorporated above and are applicable to the present invention as the first step of a method of multiple pel print quality enhancement.

Figure 3:
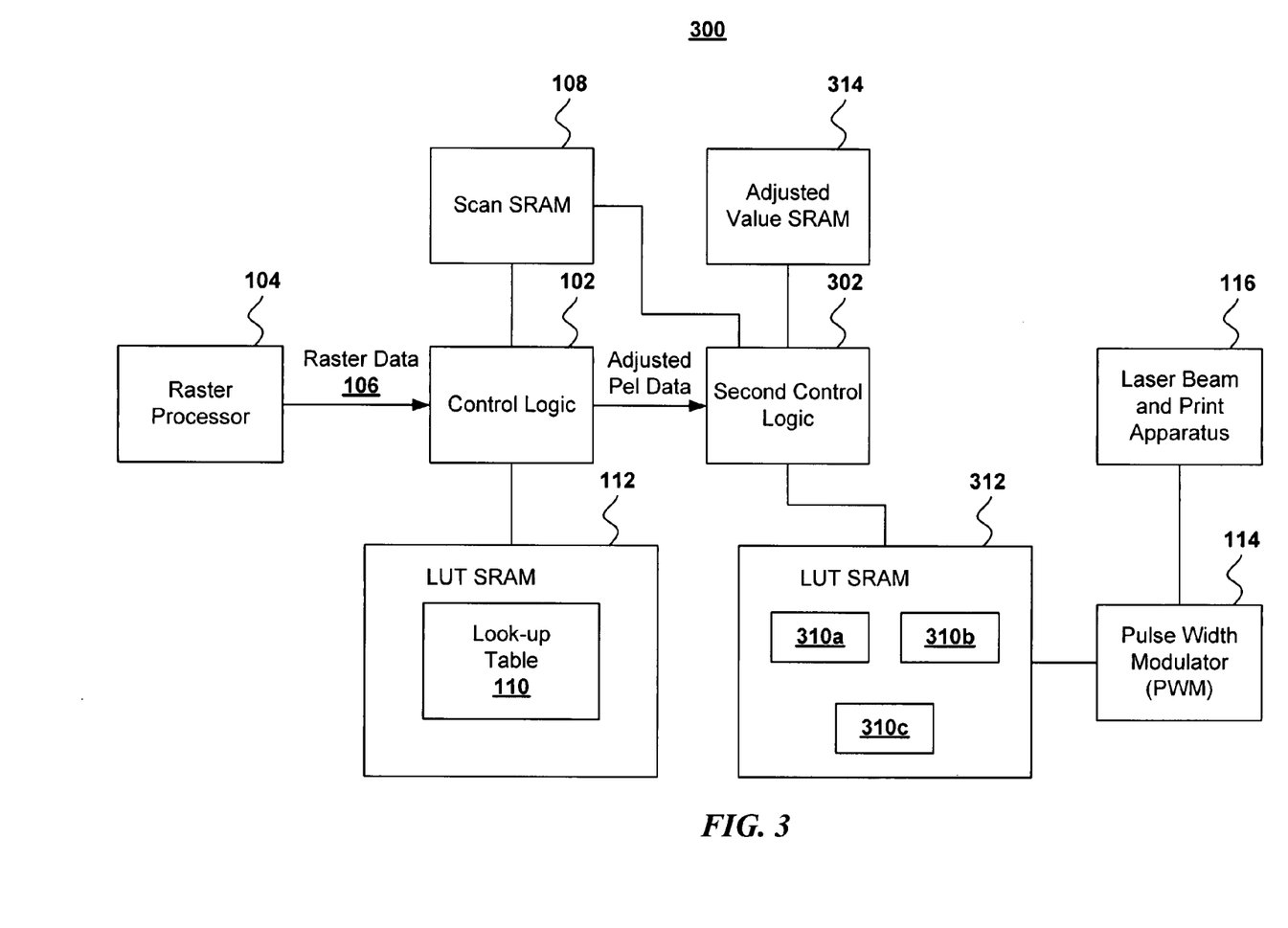
FIG. 3 illustrates a printing/computing environment in which embodiments of the present invention are implemented.

FIG. 3 illustrates the computing/printing environment 100 of FIG. 1 modified as shown to create computing/printing environment 300 to perform the multiple pel print quality enhancement of the present invention. For the sake of clarity, elements appearing unchanged from FIG. 1 retain like element numbers. In the preferred embodiment, after control logic 102 processes the raster data 106 as discussed above to create an adjusted pulse width value for each processed pel, second control logic 302 examines the adjusted pulse width value for two adjacent pels. Using the adjusted pulse width value for the two adjacent pels and the pre-calculated, pre-stored look-up tables 310*a*, 310*b*, 310*c* which are located in an accessible storage area such as SRAM 312, second control logic 302 calculates a combined pulse width value and alignment data for the combined area of the two adjacent pels. In some embodiments, second control logic 302 may store the adjusted pel value data in an accessible local or remote storage area 314 prior to processing. Also, some embodiments may have second control logic 302 access the scan SRAM 108 for the original pel data in calculating the combined pulse width value and alignment data.

As readily recognized by those skilled in the art, the exact order of the process steps described above may be varied in any advantageous manner without deviating from the present invention. For example, some embodiments of the present invention may perform all the calculations of adjusted pulse width values for the individual pels of an image first, storing the results. This embodiment would contemplate then going back and selecting the adjacent pels (two, three, or more at a time) for the performance of the combination calculations which are key to the present invention. On the other hand, alternate embodiments might perform the combined pulse width and position information calculations on each pair (or other sized group) of pels as the individual calculations are completed.

The embodiment of the present invention shown in FIG. 3 uses three look-up tables 310*a*, 310*b*, 310*c* to calculate the combined pulse width value for the two adjacent pels based on their own adjusted pulse width values and the pattern of surrounding pels. Those skilled in the relevant arts will recognize that alternate embodiments may use a different number of look-up tables or may use an alternate method of pre-calculating the combined pulse width values for the possible combinations of adjusted pulse width values and surrounding pel patterns. Alternatively, given sufficient processing speed and bandwidth, the combined pulse width values may be calculated 'on-the-fly' by second control logic 302. However, a set of three look-up tables may be advantageously employed, one look-up table corresponding to each of three categories of combined pulse width. In the case where pels are being grouped two at a time, there are three distinct categories of combined pulse width. First is the case where one of the two pels is white (a pulse width value of zero), meaning the combined pulse width value must be less than or equal to one-half (since at least half of the combined region is white or zero). Second is the case where one of the two pels is black (full pulse width), meaning the combined pulse width value must be greater than or equal to one-half (since at least half of the combined region is black). Third is the case where each of the two pels is a gray scale requiring PQE.

FIG. 3 shows control logic 102 and second control logic 302 as separate components solely for ease of illustration. Persons skilled in the art will readily recognize that the functions performed by these two component may be implemented in a single chip or other component capable of performing the described processes. Similarly, SRAMs 108 and 314 and SRAMS 112 and 312 are shown as separate components for clarity is describing the functions performed. These storage areas may comprise other types of electronic or magnetic storage, either local or remote, and may, in fact, comprise separate, identifiable portions of the same storage area.

When operating in accordance with the present invention, the printer is operated at a video data rate of twice the operating speed of the pulse width modulator 114. As such, when the combined pulse width data and alignment information is used by the pulse width modulator 114 to create the pulse width information for the laser 116, two pels of data of the bitmap are effectively charged by the laser 116, as adjusted by the PQE process described herein. The process of the present invention is equally applicable to groups of pels greater than two. If adjusted pel data is to be created for three adjacent pels, for example, the video data rate of the printer would be three times the speed of the pulse width modulator so that the pulse width and alignment data output to the pulse width modulator would create a laser beam output covering an effective area of three pels. In this way, a printer may operate at a speed which is a multiple of the speed of an available pulse width modulator and still perform effective print quality enhancement.

Figure 4A:
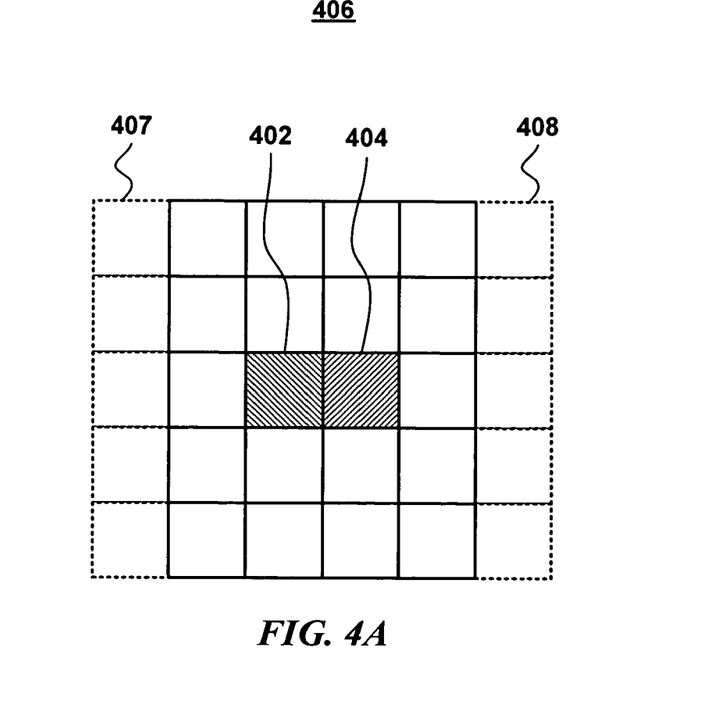
FIG. 4a illustrates a simple example of two pels which are to have their pulse width values adjusted in accordance with embodiments of the present invention.
Figure 4B:
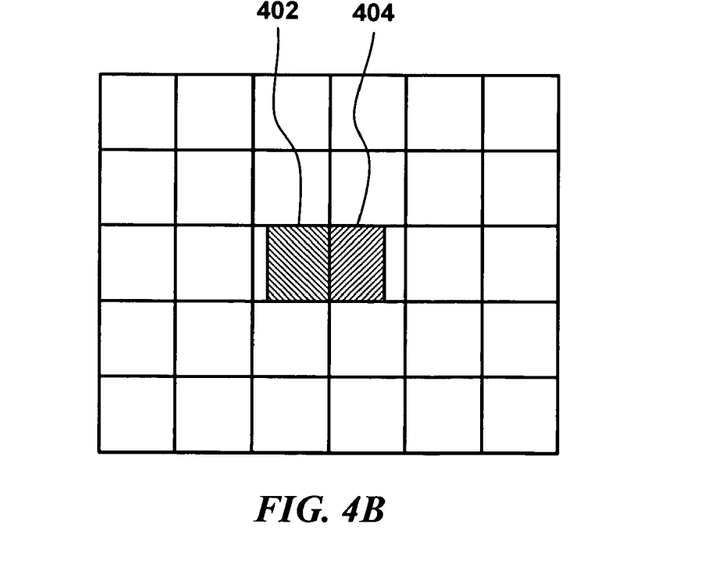
Figure 4C:
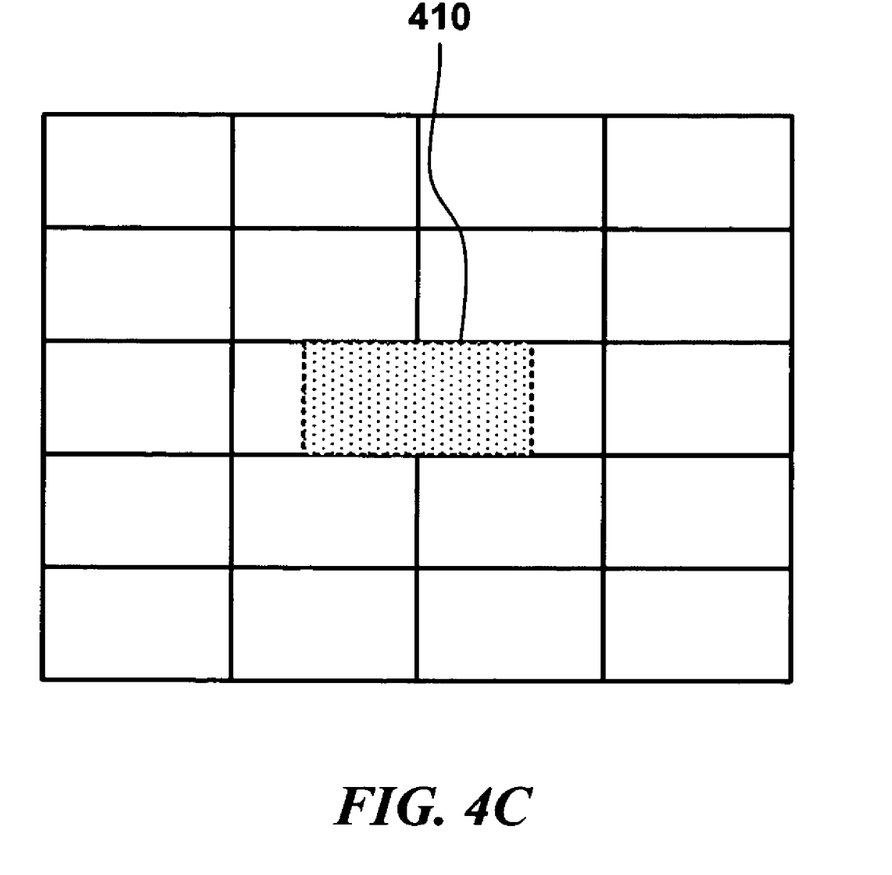
FIG. 4c illustrates the adjusted combined pulse width value for the two pels in the example of FIG. 4a in accordance with embodiments of the present invention.

FIGS. 4a, 4b and 4c illustrate a simple example of the results of the present invention operating on two adjacent pels. In FIG. 4a, two pels 402, 404 are shown prior to any PQE adjustment. Pels 402 and 404 appear as shaded to indicate that they are 'on.' Pels 402 and 404 are shown within a window of pels 406 which are being considered by the control logic of the present invention in adjusting the pulse width values for PQE purposes. The window 406 is shown here as being a rectangular shape but could also be a diamond shape or any other shape considered advantageous for a given application. The first step of PQE adjustment would be performed as described above on each pel 402, 404. For pel 402, the window 406 would include the column of pels 407. For pel 404, the window 406 would include the column of pels 408. After the first step of PQE is performed by control logic 102, the pulse width data for pels 402 and 406 may appear as shown in FIG. 4b. Adjusted pulse width and alignment data has been created for each pel via the look-up tables described above or some other method of calculation. This adjustment has been made according to some known PQE algorithm which is not essential to the present invention. As shown, the pulse width value for pel 402 has been adjusted to approximately 80% of a full-width value and the alignment data indicates the pulse is right-justified. The pulse width value for pel 404 has been adjusted to approximately 75% of a full-width value and the alignment data indicates the pulse is left justified. If a PQE system were operating according to the state of the prior art, in order to print these two pels, two separate outputs to the pulse width modulator would be required. The pulse width modulator would be required to process the first output to print pel 402, reset itself, and process the second output to print pel 404. As discussed above, the speed of the available pulse width modulators is such that the pulse width modulator processing limits the speed of the printer.

When operating in accordance with the present invention, a second step of PQE is performed to combine the adjusted pulse width value of the two pels 402, 404 into an adjusted pulse width value for the combined area of the two pels 410. As shown in FIG. 4c, the combined pulse width value (shaded) for the combined pel area 410 is a pulse width of approximately 75% with a center alignment shifted to the left by about 5%. When this data is output to a pulse width modulator operating at a speed equal to one-half of the video data rate of the printer, the resulting output covers the area for two pels of data and appears as shown in FIG. 4c. This example illustrates a direct translation of the pulse widths of the two pels to a combined pulse width but the second step of PQE combining pel data for adjacent pels may make further adjustments in pulse width values as deemed advantageous by the relevant PQE algorithm.

In the drawings and specification there has been set forth a preferred embodiment of the invention, and, although specific terms are used, the description thus given uses terminology in a generic and descriptive sense only and not for purposes of limitation.

What is claimed is:

1. A method comprising the steps of:
   identifying surrounding pels of a subject pel of an image;
   for each subject pel of the image, determining a pulse width value based on a pattern of said surrounding pels;
   using said pulse width values from at least two adjacent subject pels to;
      calculate a combined pulse width to charge a sub-region of a combined region of said at least two adjacent subject pels; and
      determine position information indicating an alignment of said sub-region within the combined region of said at least two adjacent subject pels.

2. The method of claim 1 wherein toner is attracted to the charged sub-region causing a portion of the image represented by the at least two adjacent subject pels to be printed as determined by the combined pulse width and the position information.

3. The method of claim 2 wherein said at least two adjacent subject pels consist of two adjacent subject pels.

4. The method of claim 2 wherein said at least two adjacent subject pels consist of three adjacent, subject pels.

5. The method of claim 1 wherein the surrounding pels of a subject pel form a rectangular grid with said subject pel at the center.

6. The method of claim 1 wherein the surrounding pels of a subject pel form a diamond shaped grid with said subject pel at the center.

7. The method of claim 1 wherein all possible patterns of surrounding pels are grouped into a plurality of pre-defined pattern categories.

8. The method of claim 7 wherein the plurality of pre-defined pattern categories consists of 16 pattern categories.

9. The method of claim 7 wherein the determining of a pulse width value for a subject pel comprises assigning a pre-defined pulse width value corresponding to the pre-defined pattern category into which the pattern of surrounding pels falls.

10. The method of claim 1 wherein the combined pulse width and position information is encoded in at least one look up table that provides one set of combined pulse width and position information for an input of:
    said pulse width value for each of said at least two adjacent pels;
    said pattern of said surrounding pels for each of said at least, two adjacent pels; and
    wherein said steps of calculating the combined pulse width and determining position information comprise retrieving said combined pulse width and position information from said at least one look up table.

11. The method of claim 9 wherein the combined pulse width and position information is encoded in at least one look up table that provides one set of combined pulse width and position information for an input of:
    said pulse width value for each of said at least two adjacent pels; and
    wherein said steps of calculating the combined pulse width and determining position information comprise retrieving said combined pulse width and position information from said at least one look up table.

12. The method of claim 8 wherein the determining of a pulse width value for a subject pel comprises assigning a pulse width value selected from the group of 0 through 15, inclusive, said group corresponding to the 16 predefined pattern categories and the assigned pulse width value for a subject pel corresponding to the predefined pattern category into which the pattern of pels surrounding the subject pel falls.

13. The method of claim 12 wherein a pulse width value of 0 indicates a totally blank (white) pel, a pulse width value of 15 indicates a totally black, or fully charged, pel and the pulse width values of 1 through 14 indicate a pel which is to be quality enhanced between white and black by creating a sub-pulse width less than a maximum pulse width.

14. The method of claim 13 wherein the combined pulse width and position information is encoded in at least one look up table that provides one set of combined pulse width and position information for an input of:

said pulse width value for each of said at least two adjacent pels; and wherein said steps of calculating the combined pulse width and determining position information comprise retrieving said combined pulse width and position information from said at least one look up table.

15. A method comprising the steps of:
identifying first surrounding pels of a first subject pel of an image;
determining a first pulse width value for said first subject pel based on a pattern of said first surrounding pels;
identifying second surrounding pels of a second subject pel of the image which is adjacent to said first subject pel;
determining a second pulse width value for said second subject pel based on a pattern of said second surrounding pels; and
using said first and second pulse width values to:
calculate a combined pulse width to charge a sub-region of a combined region of said first and second subject pels; and
determine position information indicating an alignment of said sub-region within the combined region of said first and second subject pels.

16. The method of claim 15 wherein toner is attracted to the charged sub-region causing a portion of the image represented by said first and second subject pels to be printed as determined by the combined pulse width and the position information.

17. The method of claim 15 wherein the surrounding pels of a subject pel form a rectangular grid with said subject pel at the center.

18. The method of claim 15 wherein the surrounding pels of a subject pel form a diamond shaped grid with said subject pel at the center.

19. The method of claim 15 wherein all possible patterns of surrounding pels are grouped into a plurality of pre-defined pattern categories.

20. The method of claim 19 wherein the plurality of pre-defined pattern categories consists of 16 pattern categories.

21. The method of claim 19 wherein the determining of a pulse width value for a subject pel comprises assigning a pre-defined pulse width value corresponding to the pre-defined pattern category into which the pattern of surrounding pels falls.

22. The method of claim 21 wherein the combined pulse width and position information is encoded in at least one look up table that provides one set of combined pulse width and position information for an input of:
said first pulse width value; and
said second pulse width value; and
wherein said steps of calculating the combined pulse width and determining position information comprise retrieving said combined pulse width and position information from said at least one look up table.

23. The method of claim 20 wherein the determining of a pulse width value for a subject pel comprises assigning a pulse width value selected from the group of 0 through 15, inclusive, said group corresponding to the 16 predefined pattern categories and the selected value for a subject pel corresponding to the predefined pattern category into which the pattern of pels surrounding the subject pel falls.

24. The method of claim 23 wherein a pulse width value of 0 indicates a totally blank (white) pel, a pulse width value of 15 indicates a totally black, or fully charged, pel and the pulse width values of 1 through 14 indicate a pel which is to be quality enhanced between white and black by creating a sub-pulse width less than a maximum pulse width.

25. The method of claim 24 wherein the combined pulse width and position information is encoded in at least one look up table that provides one set of combined pulse width and position information for an input of:
said first pulse width value; and
said second pulse width value; and
wherein said steps of calculating the combined pulse width and determining position information comprise retrieving said combined pulse width and position information from said at least one look up table.

26. A system comprising:
a raster processor for processing page description or vector graphics information of an image into pel data;
first control logic for processing each pel of the image, the processing comprising;
identifying a window of pels surrounding a subject pel;
determining an adjusted pulse width value for the subject pel based on a pattern of said surrounding pels;
second control logic for processing at least two adjacent pels, the processing comprising using the adjusted pulse width value of each of the at least two adjacent pels to;
calculate a combined pulse width to charge a sub-region of a combined region of said at least two adjacent pels; and
determine position information indicating an alignment of said sub-region within the combined region of said at least two adjacent pels;
a pulse width modulator for processing input pulse width and alignment information to create an output electronic pulse to control a laser in charging an area of a rotating drum of a printer, wherein the pulse width modulator produces said output electronic pulses at a rate equal to a video data rate of the printer divided by the number of adjacent pels processed at a time by the second control logic; and
wherein the second control logic delivers the combined pulse width and alignment information to the pulse width modulator.

27. The system of claim 26 wherein said at least two adjacent pels consist of two adjacent pels.

28. The system of claim 26 wherein said at least two adjacent pels consist of three adjacent pels.

29. The system of claim 26 wherein the surrounding pels of a subject pel form a rectangular grid with said subject pel at the center.

30. The system of claim 26 wherein the surrounding pels of a subject pel form a diamond shaped grid with said subject pel at the center.

31. The system of claim 26 wherein all possible patterns of surrounding pels are grouped into a plurality of pre-defined pattern categories.

32. The system, of claim 31 wherein the determining of a pulse width value for a subject pel comprises assigning a pre-defined pulse width value corresponding to the pre-defined pattern category into which the pattern of surrounding pels falls.

33. The system of claim 32 further comprising a storage medium accessible to said first control logic and said second control logic and having stored therein at least one look up table encoding the combined pulse width and position information to provide one set of combined pulse width and position information for an input of:
said pulse width value for each of said at least two adjacent pels; and
wherein said steps of calculating the combined pulse width and determining position information comprise retrieving said combined pulse width and position information from said at least one look up table.

34. A program product comprising:
a computer readable medium; and
computer readable instructions carried on said medium and effective, when executing in a computer system, to
identify surrounding pels of a subject pel of an image;
for each subject pel of the image, determine a pulse width value based on a pattern of said surrounding pels;
use said pulse width values from at least two adjacent subject pels to:
calculate a combined pulse width of a combined region of said at least two adjacent subject pels;
determine position information indicating an alignment of a sub-region within the combined region of said at least two adjacent subject pels;
apply a charge to said sub-region within the combined region of said at least two adjacent subject pels.

35. The program product of claim 34 wherein said at least two adjacent subject pels consist of two adjacent subject pels.

36. The program product of claim 34 wherein said at least two adjacent subject pels consist of three adjacent subject pels.

37. The program product of claim 34 wherein the surrounding pels of a subject pel form a rectangular grid with said subject pel at the center.

38. The program product of claim 34 wherein the surrounding pels of a subject pel form a diamond shaped grid with said subject pel at the center.

39. The program product of claim 34 wherein the instructions are effective when executing to group all possible patterns of surrounding pels into a plurality of pre-defined pattern categories.

40. The program product of claim 39 wherein the plurality of pre-defined pattern categories consists of 16 pattern categories.

41. The program product of claim 39 wherein the instructions are effective when executing to determine the pulse width value for a subject pel by assigning a pre-defined pulse width value corresponding to the predefined pattern category into which the pattern of surrounding pels falls.

42. The program product of claim 34 wherein the instructions are effective when executing to encode the combined pulse width and position information in at least one look up table that provides one set of combined pulse width and position information for an input of:
said pulse width value for each of said at least two adjacent pels;
said pattern of said surrounding pels for each of said at least two adjacent pels; and
wherein the instructions are effective when executing to calculate the combined pulse width and determine the position information by retrieving said combined pulse width and position information from said at least one look up table.

43. The program product of claim 41 wherein the instructions are effective when executing to encode the combined pulse width and position information in at least one look up table that provides one set of combined pulse width and position information for an input of:
said pulse width value for each of said at least two adjacent pels; and
wherein the instructions are effective when executing to calculate the combined pulse width and determine the position information by retrieving said combined pulse width and position information from said at least one look up table.

44. The program product of claim 40 wherein the instructions are effective when executing to determine a pulse width value for a subject pel by assigning a pulse width value selected from the group of 0 through 15, inclusive, said group corresponding to the 16 predefined pattern categories and the assigned pulse width value for a subject pel corresponding to the predefined pattern category into which the pattern of Surrounding pels falls.

45. The program product of claim 44 wherein a pulse width value of 0 indicates a totally blank (white) pel, a pulse width value of 15 indicates a totally black, or fully charged, pel and the pulse width values of 1 through 14 indicate a pel which is to be quality enhanced between white and black by creating a sub-pulse width less than a maximum pulse width.

46. The program product of claim 45 wherein the instructions are effective when executing to encode the combined pulse width and position information in at least one look up table that provides one set of combined pulse width and position information for an input of:
said pulse width value for each of said at least two adjacent pels; and
wherein the instructions are effective when executing to calculate the combined pulse width and determine the position information by retrieving said combined pulse width and position information from said at least one look up table.

* * * * *